(12) United States Patent
Semitsu et al.

(10) Patent No.: US 11,417,134 B2
(45) Date of Patent: Aug. 16, 2022

(54) IMAGE ANALYSIS DEVICE, IMAGE ANALYSIS METHOD, AND RECORDING MEDIUM

(71) Applicant: Mitsubishi Electric Corporation, Tokyo (JP)

(72) Inventors: Takayuki Semitsu, Tokyo (JP); Toshisada Mariyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 98 days.

(21) Appl. No.: 17/096,470

(22) Filed: Nov. 12, 2020

(65) Prior Publication Data

US 2021/0064857 A1 Mar. 4, 2021

Related U.S. Application Data

(63) Continuation of application No. PCT/JP2018/019102, filed on May 17, 2018.

(51) Int. Cl.
*G06V 40/10* (2022.01)
*G06T 7/00* (2017.01)
(Continued)

(52) U.S. Cl.
CPC .............. *G06V 40/10* (2022.01); *G06T 7/246* (2017.01); *G06T 7/60* (2013.01); *G06V 20/52* (2022.01);
(Continued)

(58) Field of Classification Search
None
See application file for complete search history.

(56) References Cited

U.S. PATENT DOCUMENTS

2013/0259381 A1* 10/2013 Srinivasan ................ G06T 7/70
382/192
2015/0254514 A1 9/2015 Oami
(Continued)

FOREIGN PATENT DOCUMENTS

JP 2007-274656 A 10/2007
JP 2008-250686 A 10/2008
(Continued)

OTHER PUBLICATIONS

International Search Report (PCT/ISA/210) issued in PCT/JP2018/019102, dated Aug. 7, 2018.

*Primary Examiner* — Matthew C Bella
*Assistant Examiner* — Brian D Shin
(74) *Attorney, Agent, or Firm* — Birch, Stewart, Kolasch & Birch, LLP.

(57) ABSTRACT

An image analysis device includes a person detecting unit for detecting person images from image information from a surveillance camera, and acquiring both pieces of person image information as a result of the detection of person images, and pieces of attribution information about persons corresponding to the pieces of person image information, and a person narrowing down unit for performing narrowing-down of person image information with respect to the pieces of person image information and the pieces of person attribution information which are acquired by the person detecting unit, on the basis of a person narrowing down rule, to acquire person image information after the narrowing-down and attribution information about a person corresponding to the person image information.

10 Claims, 5 Drawing Sheets

(51) Int. Cl.
  *G06V 20/00* (2022.01)
  *G06T 7/246* (2017.01)
  *G06T 7/60* (2017.01)
  *H04N 7/18* (2006.01)
  *G06V 20/52* (2022.01)
  *G06V 40/20* (2022.01)

(52) U.S. Cl.
  CPC ............... *G06V 40/20* (2022.01); *H04N 7/18* (2013.01); *G06T 2207/30196* (2013.01); *G06T 2207/30232* (2013.01)

(56) References Cited

U.S. PATENT DOCUMENTS

| | | |
|---|---|---|
| 2016/0092739 A1 | 3/2016 | Oami et al. |
| 2016/0196728 A1* | 7/2016 | Suman ................... G06V 20/52 382/103 |
| 2017/0053409 A1 | 2/2017 | Yamamoto et al. |

FOREIGN PATENT DOCUMENTS

| | | |
|---|---|---|
| JP | 2010-2976 A | 1/2010 |
| JP | 2016-71830 A | 5/2016 |
| JP | 2017-41022 A | 2/2017 |
| WO | WO 2014/050518 A1 | 4/2014 |

\* cited by examiner

IMAGE ANALYSIS DEVICE, IMAGE ANALYSIS METHOD, AND RECORDING MEDIUM

CROSS-REFERENCE TO RELATED APPLICATIONS

This application is a Continuation of PCT International Application No. PCT/JP2018/019102, filed on May 17, 2018, all of which is hereby expressly incorporated by reference into the present application.

TECHNICAL FIELD

The present disclosure relates to an image analysis device, an image analysis method, and a program, and particularly relates to a technique of recognizing a person's behavior from an image.

BACKGROUND ART

Patent Literature 1 is known as a technique of detecting, analyzing, and tracking persons as targets in monitor space by using a monitor image of a surveillance camera, and detecting suspicious persons on the basis of a result of the tracking.

The technique shown in Patent Literature 1 is as follows. More specifically, an image of the monitor space is captured by a surveillance camera mounted in the monitor space at predetermined time intervals. Partial models showing the cubic shapes of multiple components which constitute a target and a target model which is data in which the arrangement relationship among the partial models is described are stored. The stored target model is virtually arranged, with a predetermined posture, at a candidate position in the monitor space whose image is captured. Perspective projection of the target model is performed on the basis of a projection condition, and a partial model visible region onto which each of the partial models is projected is acquired for the partial model. Parts corresponding to the partial model visible regions are extracted as images of the components of the target from the captured monitor image of the monitor space. The presence of the target exists is determined from the predetermined image features of the component images.

CITATION LIST

Patent Literature

Patent Literature 1: JP 2010-2976 A

SUMMARY OF INVENTION

Technical Problem

In the conventional technology shown in Patent Literature 1, by using the target model having the partial models showing the cubic shapes of the multiple components for a monitor image which the surveillance camera acquires by capturing an image of the inside of the monitor space, an improvement in the accuracy of detecting and tracking a person in the monitor image can be achieved.

However, because the accuracy of person detection decreases depending on the monitor image (scene) which the surveillance camera captures at predetermined time intervals, it is necessary to improve the accuracy of the target model, and to collect samples of the target which is desired to be detected in a scene to be applied, to update the target model, for example.

The present disclosure is made in order to solve the above-mentioned problem, and it is therefore an object of the present disclosure to provide a new image analysis device that recognizes a person's behavior from image information from a surveillance camera.

Solution to Problem

The image analysis device according to the present disclosure includes: a person detecting unit for detecting person images from image information from a surveillance camera, and acquiring both pieces of person image information as a result of the detection of person images, and pieces of attribution information about persons corresponding to the pieces of person image information; and a person narrowing down unit for performing narrowing-down of person image information on the pieces of person image information and the pieces of person attribution information which are acquired by the person detecting unit, on the basis of a person narrowing down rule, to acquire person image information after the narrowing-down and attribution information about a person corresponding to the person image information, a person tracking unit for acquiring both a tracking result in the person image information after the narrowing-down by the person narrowing unit and the attribution information about the person corresponding to the person image information, and attribution information about a person who is a target for the tracking result; an event determining unit for detecting an event on a basis of both the tracking result of a person and the attribution information about the person which are acquired by the person tracking unit; and a narrowing down rule generating unit for generating a self-generated narrowing down rule from the person tracking result and the person attribution information which are acquired by the person tracking unit, on a basis of a set-up narrowing down criterion, wherein the person narrowing down rule includes the self-generated narrowing down rule, and the self-generated narrowing down rule is based on person rectangles excluding both person rectangles intermittently appearing at random positions and person rectangles staying at identical positions, out of person rectangles which have appeared, as the person tracking result acquired by the person tracking unit, within a time zone within which a number of person rectangles per time which have appeared as the person tracking result acquired by the person tracking unit is equal to or less than a threshold.

Advantageous Effects of Invention

According to the present disclosure, because the pieces of person image information detected from the image information from the surveillance camera are narrowed down by the person narrowing down unit, misrecognition of persons can be reduced efficiently.

DESCRIPTION OF EMBODIMENTS

Hereafter, in order to explain the present disclosure in greater detail, preferred embodiments of the present disclosure will be explained with reference to the accompanying drawings.

Embodiment 1

Embodiment 1 of the present disclosure will be explained using FIGS. 1 to 6.

Figure 1:
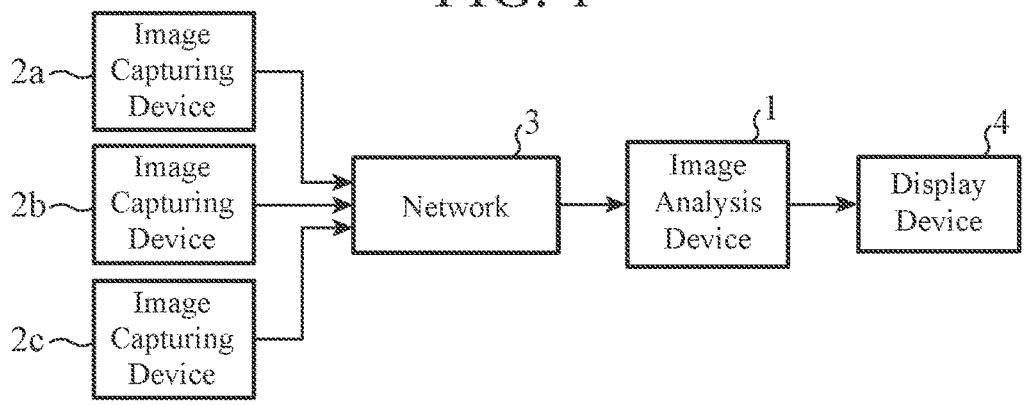
FIG. 1 is a block diagram showing an image analysis system including an image analysis device 1 according to Embodiment 1 of the present disclosure.

First, an image analysis system including an image analysis device 1 according to Embodiment 1 of the present disclosure will be explained using FIG. 1.

Each of image capturing devices 2a to 2c captures an image of the inside of corresponding monitor space. In this Embodiment 1, the image capturing devices 2a to 2c are surveillance cameras and will be generically referred to as surveillance cameras 2 hereafter.

Pieces of image information captured by the surveillance cameras 2 are transmitted via a network 3. The image analysis device 1 detects and tracks an object (a person or the like) on the basis of the pieces of image information received via the network 3. The image analysis device 1 recognizes behavior by combining a rule regarding appearance (images and spatial directions) and a rule regarding movements (in a time direction), and particularly determines doubtful behavior, i.e., so-called deviant behavior and tracks an object. In the determination of doubtful behavior, the definition of doubtful behavior that serves as a key for identifying a suspicious person leads to the detection of a suspicious person. For example, in the case of inspection of tickets in a limited express train, the detection (optical flow) of passengers' behaviors and a conductor's recognition (convolutional neural network (CNN)) are combined, and "a passenger who, when a conductor enters, rises to leave the car as if he or she avoids the conductor" is detected as a doubtful passenger. The detection of doubtful behavior in this way leads to the recognition of, for example, a passenger who is stealing a ride.

A display device 4 includes a display or the like and displays the pieces of image information received by the image analysis device 1, a detection result and a tracking result which are provided by the image analysis device 1, a result of the determination of an event, the determination being based on the detection result and the tracking result, and so on.

The network 3 takes the form of a cable, wireless, or the like.

Further, although the example in which the image analysis device 1 receives the pieces of image information from the surveillance cameras 2 via the network 3 is shown, this embodiment is not limited to this example, and the pieces of image information from the surveillance cameras 2 may be read into video and the image analysis device may receive the pieces of image information read into the video and inputted from the surveillance cameras 2.

Next, the image analysis device 1 according to Embodiment 1 of the present disclosure will be explained using a functional configuration diagram shown in FIG. 2.

A person detecting unit 11 detects person images from the pieces of image information from the surveillance cameras 2, the pieces of image information being received, i.e., inputted via the network 3. This detection is based on the rule regarding appearance (images and spatial directions) and is implemented by, for example, a machine learning technique based on a convolutional neural network (CNN).

A result of the detection of person images is outputted as pieces of person image information including pieces of rectangle information about the person images, the reliability of the detection result, and an intermediate product such as a feature map used for determination.

When person images are detected, the determination of attributes is also performed simultaneously. The determination of attributes is performed by estimating gender, age, facial expression, clothes, and so on. For example, conductors in vehicles, or guards, elderly persons and persons with a white cane (visually impaired persons), clerks in charge, or the likes in buildings, namely, persons' attributes are recognized.

A result of this recognition of persons' attributes is also acquired as pieces of person attribution information, together with the pieces of person image information.

A person narrowing down unit 12 performs narrowing-down of person image information in consideration of the pieces of person image information and the pieces of person attribution information which are acquired by the person detecting unit 11, on the basis of a person narrowing down rule stored in a narrowing down rule database (DB) 13. To person image information after the narrowing-down is also added person attribution information corresponding to the person image information.

The person narrowing down unit 12 performs screening on candidates for person rectangles in a scene, i.e., one image (frame) captured by each surveillance camera 2, on the basis of the heights of the rectangles, by using a person rectangle height narrowing down rule which is calculated on the basis of the geometric relationship between the floor of the monitor space and the surveillance camera 2. The person narrowing down rule stored in the narrowing down rule database (DB) 13 includes this person rectangle height narrowing down rule.

The person rectangle height narrowing down rule that is generated on the basis of the geometric relationship between the floor of the monitor space and each surveillance camera 2, i.e., the selection of a person rectangle candidate on the basis of the heights of the rectangles will be explained using FIG. 3 explaining a situation in which a person is seen on the screen when, for example, a pinhole camera is mounted in parallel with the floor.

Figure 3:
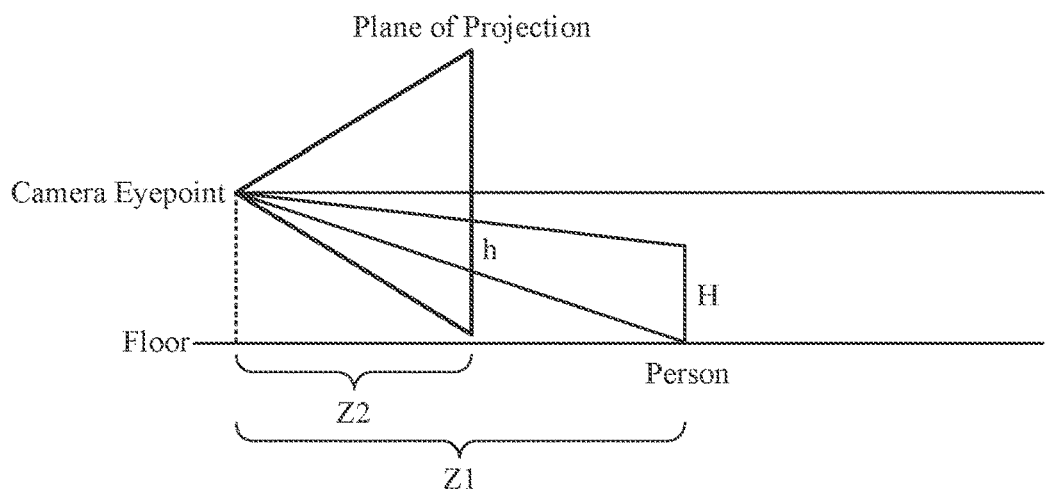
FIG. 3 is a view explaining a situation in which a person is seen on a screen when a pinhole camera is mounted in parallel with a floor.

In FIG. 3, H denotes the height of a person when the whole body of the person is seen, h denotes the size of a person indicated by a person image on a plane of projection, the person image being captured by the pinhole camera, Z1 denotes the depth from the pinhole camera to the person image, and Z2 denotes the distance from the pinhole camera to the plane of projection.

The size h of the person on the plane of projection is expressed by the following equation (1).

$$h = H * Z2/Z1 \tag{1}$$

As can be understood from this equation (1), assuming that the height H of the person and the distance Z2 from the pinhole camera to the plane of projection are fixed, the size h of the person image is in inverse proportion to the depth Z1 to the person.

Even in the case in which the person image captured onto the plane of projection and the person are not parallel to each other, in other words, even in the case in which the pinhole camera is not mounted in parallel with the floor, the relation between the size h of the person image and the depth Z1 to the person can be expressed by a mathematical expression using three-dimensional geometry.

In this case, two conditions are needed. The First condition includes capturing multiple images of a pattern whose relative relation in coordinates on the real world is known, e.g., a chessboard by using the pinhole camera, and extracting corresponding points from each of the captured images, in order to determine an internal matrix of the pinhole camera. The second condition includes determining the relation between multiple points on the floor, concretely, three or more points on the floor and corresponding points on the screen, in order to calculate the geometrical relation (an external matrix) between the pinhole camera and the floor.

There is a case in which the advance preparation as mentioned above cannot be made when the pinhole camera is mounted. For such a case, there is provided a method of approximately determining a function of receiving a height on the screen and outputting the height of a person rectangle. Concretely, the function may be nonlinear or linear, or the determination may be performed even using piecewise linear. A parameter for these functions is determined by using a least square method from data. For example, a height on the screen on which the person is seen and the height of the rectangle from an image captured by the camera are extracted.

More specifically, it is a method of extracting the relation between the height of a person on the screen on which the person is seen and the height of the rectangle from an image captured by the camera.

Figure 4:
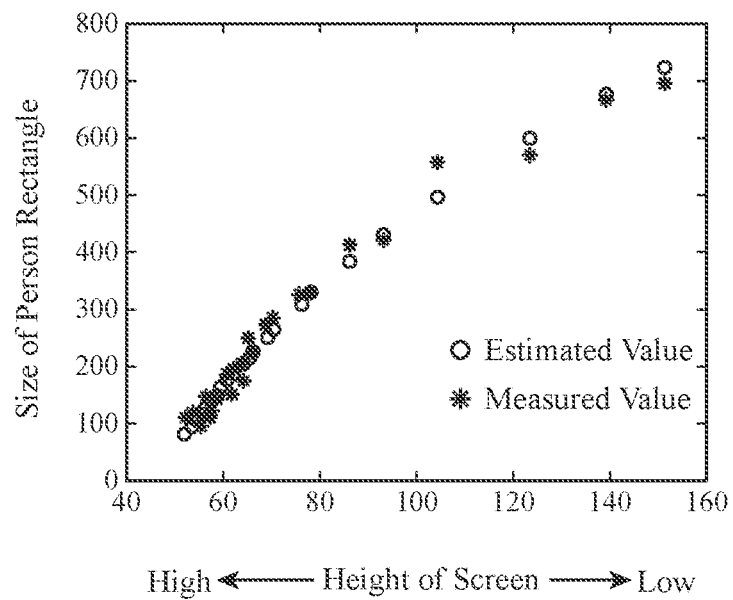
FIG. 4 is a graph in which a relation of the size of a person rectangle with respect to the height of the screen when a surveillance camera 2 is actually mounted at an angle at which the surveillance camera is directed slightly downward with respect to a direction parallel to the floor is plotted.

The method of performing the determination in this way will be explained using FIG. 4. FIG. 4 is a graph in which a relation of the height of a person rectangle with respect to each value of screen height in the case in which the camera is mounted at an angle at which the camera is directed slightly downward with respect to a direction parallel to the floor is plotted. The height of the person image on the screen is shown on the horizontal axis and the height of the person rectangle is shown on the vertical axis, and each 0 mark shows an estimated value and each * mark shows a measured value.

FIG. 4 shows, as an example, the relation between a value of height of the screen regarding a person with a height of 170 cm and the height of the person rectangle. By setting up an upper limit and a lower limit of errors for the height of the person from the relation between a value of height of the screen and the height of the person rectangle, the relation being determined in this way, an allowable rectangle height range on the screen is set up. For example, when up to 20% is allowed as each of the upper and lower limits of the height of the person rectangle which is acquired for each value of screen height, persons with a height ranging from 136 cm to 204 cm are set as a detection range in the case in which data at each height on the screen is acquired for persons with a height of 170 cm.

Although in the example shown in FIG. 4 the case of a person with a height of 170 cm is shown, the detection range can be determined in the same way also for a height of 160 cm, a height of 180 cm and so on.

Further, actually measured results may be used for the relation between the height of the screen and the height of the person rectangle, and a height may be set up for each height position on the screen and the determination may be performed using an estimated value because the measured values and the estimated values nearly match each other as can be understood also from FIG. 4.

Instead of the method of uniquely determining the height of the person rectangle for the height of the screen, a method of expressing the height of the person rectangle, as a distribution, e.g., a normal distribution, for each person image height on the screen, and determining the distribution itself or a parameter showing the distribution may be used.

For example, by using the function determined in this way, up to 20% is allowed as each of the upper and lower limits of the height of the person rectangle which is acquired for each screen height with respect to persons with a height of 170 cm, as an example.

More specifically, in the case in which a person with a height of 170 cm is narrowed down by the person narrowing down unit 12, as a person rectangle height narrowing down rule stored in the person narrowing down rule database 13, persons with a height ranging from 136 cm to 204 cm are set as the detection range, and a detection range of person rectangle heights is caused to correspond to the detection range of heights from 136 cm to 204 cm.

The detection range of person rectangle heights which is determined in this way includes a person narrowing down rule stored in the person narrowing down rule database 13 and a person rectangle height narrowing down rule.

Although the example in which this detection range is handled directly as values of the height of the person rectangle is explained, in the case of the distribution, up to 20% may be allowed as each of upper and lower limits of integral values.

On the basis of the detection range of person rectangle heights which is the person rectangle height narrowing down rule stored in the person narrowing down rule database 13, the person narrowing down unit 12 narrows down the pieces of person image information from the person detecting unit 11 on a scene-by-scene basis.

As mentioned above, because the pieces of person image information are narrowed down by the person narrowing down unit 12 by using the heights of person rectangles which are based on the person rectangle height narrowing down rule and for which an upper limit and a lower limit are set up in accordance with heights in which up to 20% is allowed, as each of the upper and lower limits, for heights, in other words, person rectangles falling outside the range of person rectangle heights in which the upper limit and the lower limit are set up are excluded as misrecognition, the accuracy of the narrowing-down of the pieces of person image information can be improved without having to extract samples of target persons to be detected for each different scene, and to cause the image analysis device 1 to learn the samples.

A person tracking unit 14 tracks a person image that has been narrowed down on a scene-by-scene basis, on the basis of both the person image information narrowed down using the person narrowing down rule by the person narrowing down unit 12 and the person attribution information corresponding to the person image information. A tracking result is acquired together with the person attribution information.

The tracking result is acquired in the following way. More specifically, for each image (frame) which is one scene and which is captured by each surveillance camera 2, tracking is perceived as a problem of matching in a bipartite graph between a person rectangle in the current frame and that in a previous frame, and a correspondence is established by solving the matching problem as a graph problem.

A scheme to perform person tracking, as a matching problem, on the basis of the detected person rectangle in this way is called tracking-by-detection, and has an advantage of making it possible to perform processing more robustly compared with a method of learning a Kalman filter and a tracking unit used for each person, even in a complicated scenario in which many persons appear and pass one another.

Further, the person tracking unit 14 outputs motion vector information which shows the motion of the person rectangle between the current frame and the previous frame with a vector by using an optical flow.

By using the motion vector information, for example, in an event site, whether or not a visitor is in a seat or moving through a path can be detected as motion, and, in a building or a commercial facility, a user's motion can be detected. Further, simple movements, such as holding an object and raising a hand, can also be recognized.

An event determining unit 15 performs the detection of an event on the basis of the result of the tracking of the person from the person tracking unit 14 and the attribution information about the person. The person tracking result from the person tracking unit 14 is track information which is used in the person tracking unit 14 and which shows the locus along which the person rectangle has moved, and is also motion vector information showing the motion of the person rectangle with a vector.

As an example of the determination by the event determining unit 15, a case in which there is a dangerous area (floor) in the monitor space and it is determined whether a person has entered the dangerous area will be explained. In this case, information about the dangerous area is stored in a database 16 for event determination. The determination is performed by determining whether or not the feet (the middle point of the base) of the person rectangle are included in the dangerous area stored in the database 16 for event determination, the person rectangle corresponding to the person image information after the narrowing-down by the person narrowing down unit 12 and the feet being shown by the person tracking result from the person tracking unit 14. Although the case in which the information about the dangerous area is stored in the database 16 for event determination is explained, the dangerous area may be indicated by specifying an area on an image captured by a surveillance camera 2 and displayed on the display device 4.

Further, the event determining unit 15 can specify, for example, an elderly person, compare information about the specified elderly person, with results of the tracking of a person from the person tracking unit 14 and the pieces of attribution information about the person, perform determination, and extract the elderly person.

The information about the specified elderly person may be stored in the database 16 for event determination.

In addition, the event determining unit 15 combines the results of the tracking of two or more persons from the person tracking unit 14 and performs the determination. For example, a clerk in charge is specified, information about the specified clerk in charge is compared with the results of the tracking of the person from the person tracking unit 14 and the pieces of attribution information about the person, the determination is performed, and the clerk in charge is extracted. Also, a person is identified from the results of the tracking of persons from the person tracking unit 14 and the pieces of attribution information about the persons. When the event determining unit 15 recognizes that the identified person has started moving as if he or she escapes from an image captured by a surveillance camera 2 after recognizing that the specified clerk in charge appears in an image captured by a surveillance camera 2, it is determined that the identified person is a suspicious person, and the determination is output. It is possible to detect, as a doubtful passenger, "a passenger who, when a conductor enters a car, rises to leave the car as if he or she avoids the conductor."

In this case, a rule including pieces of information about clerks in charge and the relation between the pieces of information about the clerks in charge and the pieces of track information about person rectangles from the person tracking unit 14 is stored in the database 16 for event determination.

Information like the determination information determined by the event determining unit 15, the presence or absence of entry into a dangerous area, the presence or absence of an elderly person, or the presence or absence of a suspicious person is outputted to the display device 4 together with the pieces of image information captured by the surveillance cameras 2.

Next, the hardware configuration of the image analysis device 1 shown in FIG. 2 will be explained using FIGS. 5 and 6.

Figure 5:
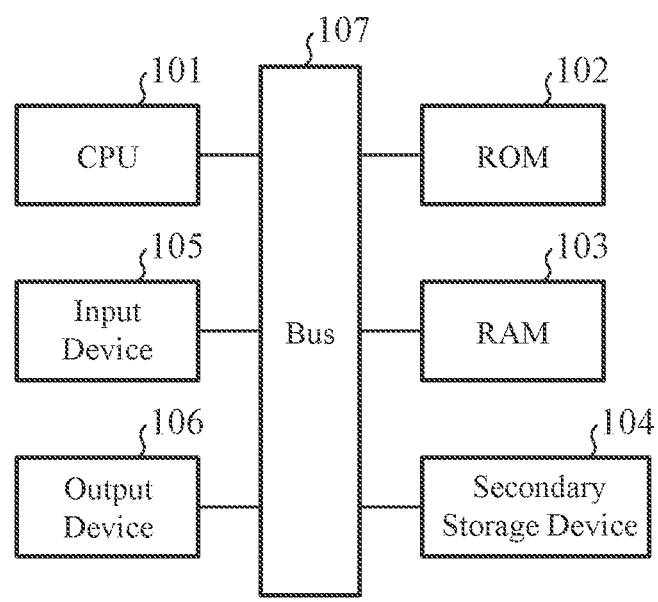
FIG. 5 is a block diagram showing the hardware configuration of the image analysis device 1 according to Embodiment 1 of the present disclosure.

The image analysis device 1 includes a CPU 101, a ROM 102, a RAM 103, a secondary storage device 104 such as an HDD, an input device 105, an output device 106, and a bus 107 connecting among these devices 101 to 106, as shown in FIG. 5.

The CPU 101 reads a program recorded in the ROM 102 or the RAM 103 and performs processing.

The ROM 102 is a nonvolatile memory and records the program and a process needed for starting the system.

Figure 6:
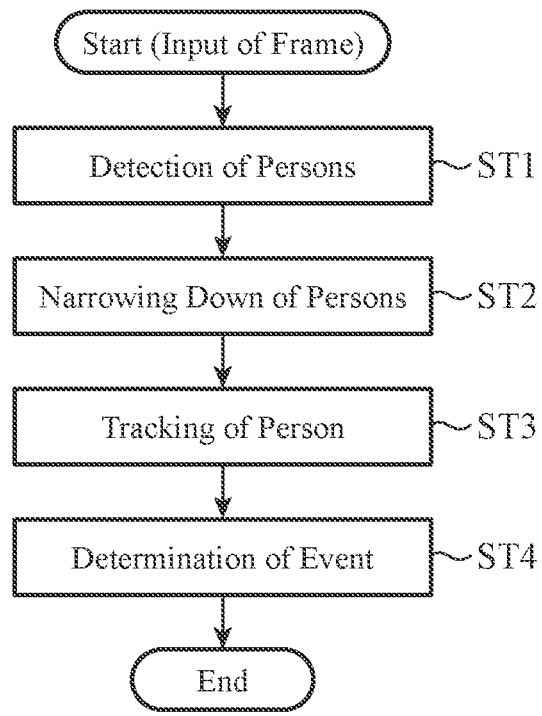
FIG. 6 is a flowchart showing a flow of event reorganization processing in the image analysis device 1 according to Embodiment 1 of the present disclosure.

In this Embodiment 1, a program for performing a flowchart showing a processing flow shown in FIG. 6 of the event recognition in the image analysis device 1 is stored.

The flowchart shown in FIG. 6 includes a person detecting step ST1, a person narrowing down step ST2, a person tracking step ST3, and an event determining step ST4.

Figure 2:
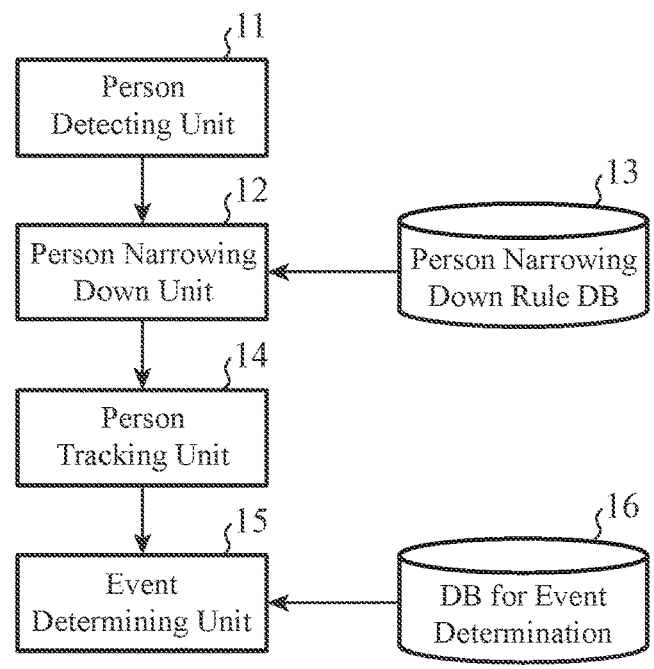
FIG. 2 is a functional configuration diagram showing the image analysis device 1 according to Embodiment 1 of the present disclosure.

The relation between the steps ST1 to ST4, and the person detecting unit 11, the person narrowing down unit 12, the person tracking unit 14, and the event determining unit 15 in the image analysis device 1 shown in FIG. 2 is as follows.

More specifically, the person detecting step ST1 corresponds to the step performed by the person detecting unit 11 and is the one of detecting person images from the pieces of image information from the surveillance cameras 2 on the basis of the rule regarding appearance (images, spatial directions) by using, for example, a machine learning technique based on CNN, and acquiring pieces of person image information as a result of the detection of person images, and pieces of person attribution information corresponding to the pieces of person image information.

The person narrowing down step ST2 corresponds to the step performed by the person narrowing down unit 12, and is the one of receiving the pieces of person image information and the pieces of person attribution information which are acquired in the person detecting step ST1, and narrowing down the pieces of person image information on the basis of the person narrowing down rule, to acquire person image information after the narrowing-down and the person attribution information corresponding to the person image information. The person narrowing down rule at this time includes the person rectangle height narrowing down rule, and the person rectangle height narrowing down rule is a rule in which an upper limit and an lower limit are set for the height of a person who is a target for narrowing-down, and the detection range of person rectangle heights which corresponds to the range from the upper limit to the lower limit is provided, which is stored in the secondary storage device 104.

The person tracking step ST3 corresponds to the step performed by the person tracking unit 14, and is the one of tracking the person image information after the narrowing-down in the person narrowing down step ST2 and the person attribution information corresponding to the person image information on a scene-by-scene basis, and acquiring a result of the tracking and the attribution information about the person who is the target for the tracking result. The tracking result at this time is track information showing the locus along which the person rectangle has moved, and is motion vector information showing the motion of the person rectangle with a vector.

The event determining step ST4 corresponds to the step performed by the event determining unit 15, and is the one of detecting an event on the basis of both the result of the tracking of the person, the result being acquired in the person tracking step ST3, and the attribution information about the person. The detection of an event at this time is the one implemented by performing the determination, such as determination of the presence or absence of a person's motion, e.g., the presence or absence of invasion into a dangerous area, determination of the presence or absence of a specified person, or determination of the presence or absence of a suspicious person.

To sum up, the program stored in the ROM 102 is the one for causing a computer that constitutes the hardware of the image analysis device 1 to perform a person detecting procedure shown as the person detecting step ST1, a person narrowing down procedure shown as the person narrowing down step ST2, a person tracking procedure shown as the person tracking step ST3, and an event determining procedure shown as the event determining step ST4. This program is read by the CPU 101 from the ROM 102 via the bus 107, and the processing is performed.

The RAM 103 is a volatile memory, and pieces of temporary data including a feature map generated at the time of recognition and detection of an event in the event determining step ST4 and the pieces of image information captured by the surveillance cameras 2 are stored under the control of the CPU 101 and are read by the CPU 101 via the bus 107, and the processing is performed. As the feature map, the above-mentioned detection range of person rectangle heights, the information about a dangerous area, the attribution information about a specified person, the track information about a person rectangle, or the like is provided.

The secondary storage device 104 is a hard disk drive or the like, and records the pieces of image information captured by the surveillance cameras 2, setting information about the program, and so on. Stored information is read by the CPU 101 via the bus 107, and the processing is performed.

The input device 105 is a keyboard and a mouse for receiving an input from a user, and a notification of inputted information is provided for the CPU 101 via the bus 107.

The output device 106 outputs a result, and outputs a processing result acquired via the bus 107 and provided by the CPU 101 in order to draw the processing result on the display device 4 and outputs the processing result provided by the CPU 101 in order to transmit the processing result, as a result file, to another device.

Next, the operation of the image analysis device 1 constructed in this way will be explained. In the case in which the pieces of image information captured by the surveillance cameras 2 are analyzed directly, and also in the case in which the pieces of image information captured by the surveillance cameras 2 are stored temporarily in the secondary storage device 104 and the pieces of image information stored in the secondary storage device 104 are analyzed, the same operation is performed.

First, when receiving an instruction to start an image analysis from the input device 105, the CPU 101 reads the program of the person detecting procedure from the ROM 102 and performs the person detecting step ST1.

As a result, pieces of person image information as a result of the detection of person images and pieces of person attribution information corresponding to the pieces of person image information are acquired.

As the next step, the CPU 101 reads the program of the person narrowing down procedure from the ROM 102 and performs the person narrowing down step ST2. At this time, the detection range of person rectangle heights which is the person rectangle height narrowing down rule in the person narrowing down rule stored in the secondary storage device 104 is read to the CPU 101, and the pieces of person image information as a result of the detection of person images are narrowed down and person image information after the narrowing-down and the person attribution information corresponding to the person image information are acquired.

Then, the CPU 101 reads the program of the person tracking procedure from the ROM 102 and performs the person tracking step ST3.

As a result, the person image information after the narrowing-down and the person attribution information corresponding to the person image information are tracked on a scene-by-scene basis, and a result of the tracking and the attribution information about the person who is the target for the tracking result are acquired.

Finally, the CPU 101 reads the program of the event determining procedure from the ROM 102 and performs the event determining step ST4.

At this time, on the basis of event instruction information provided by the input device 105, a process in accordance with the instruction information is performed by the CPU 101. For example, on the basis of the instruction information like the presence or absence of a person's motion, e.g., the presence or absence of invasion into a dangerous area, the presence or absence of a specified person, or the presence or absence of a suspicious person, determination based on the instruction information is performed and a result of the detection of an event is outputted via the output device 106.

The outputted result is displayed on the display device 4 and is recognized by the user.

Because the image analysis device 1 according to Embodiment 1 of the present disclosure is constructed as above, and, particularly, the person detecting unit 11 performs the detection on the basis of the rule regarding appearance (images and spatial directions) and the event determining unit 15 performs the determination on the basis of the rule regarding motion (in a time direction), the accuracy of the recognition of a person is improved.

In addition, because the pieces of person image information are narrowed down by the person narrowing down unit 12 on the basis of the person rectangle height narrowing down rule in the person narrowing down rule, misrecognition of persons can be reduced efficiently. As a result, there is provided an advantage of being able to improve the accuracy of the narrowing-down of the pieces of person image information without having to extract samples of target persons to be detected for each different scene, and to cause the image analysis device 1 to learn the samples.

Embodiment 2

Next Embodiment 2 of the present disclosure will be explained.

An image analysis device 1 according to Embodiment 2 has the same basic configuration as the image analysis device 1 shown in Embodiment 1, and more specifically has the same basic configuration as that of the functional configuration diagram shown in FIG. 2 and that of the block diagram shown in FIG. 5. A different point is that as a person narrowing down rule stored in a person narrowing down rule database 13, i.e., a secondary storage device 104 in terms of hardware, an inside-path narrowing down rule for, in the case in which there is a path in monitor space, detecting a person when the person appears in the path is further added to the image analysis device 1 shown in Embodiment 1.

Figure 7:
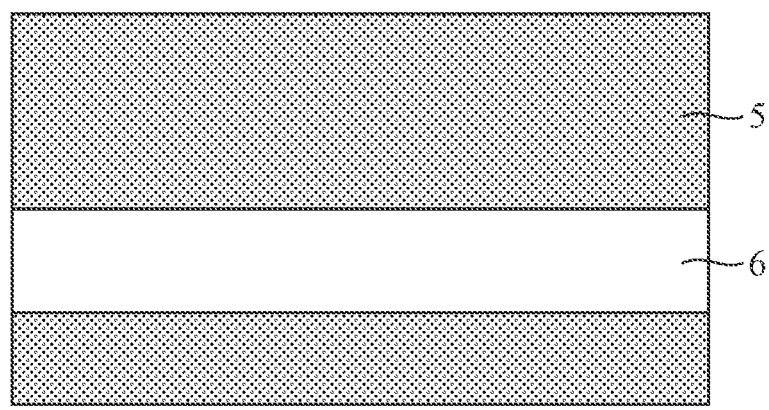
FIG. 7 is a view showing a path map which is acquired when a surveillance camera 2 captures an image of a path 6 in monitor space 5 in a direction perpendicular to a passage direction of the path at a small elevation angle, in an image analysis device 1 according to Embodiment 2 of the present disclosure.
Figure 8:
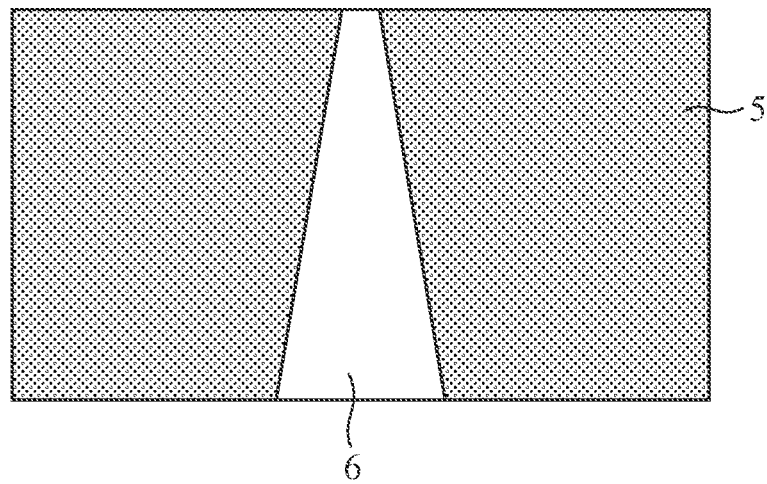
FIG. 8 is a view showing a path map which is acquired when a surveillance camera 2 captures an image of the path 6 in the monitor space 5 from the front in the passage direction of the path, in the image analysis device 1 according to Embodiment 2 of the present disclosure.

More specifically, FIG. 7 shows a path map in which there is a path 6 in monitor space 5 and which is captured at a small depression angle by a surveillance camera 2 installed at a right angle with respect to a direction of passage through the path 6, and FIG. 8 shows a path map which is captured by a surveillance camera 2 installed at an angle from the front in the direction of passage through the path 6.

In the inside-path narrowing down rule, while path information about the path 6 which is acquired from these path maps is stored, pieces of feet information about person rectangles corresponding to pieces of person image information from a person detecting unit 11 and the path information are compared.

As a comparison result, a result in which it is determined that the feet information about a person rectangle is positioned inside the path information is narrowed down as person image information. This inside-path narrowing down rule is set as one of the person narrowing down rules. This person narrowing down rule is stored in the person narrowing down rule database 13, i.e., the secondary storage device 104 in terms of hardware.

Further, a person narrowing down step ST2 shown in FIG. 6 is one of performing narrowing-down of person image information on the pieces of person image information and the pieces of person attribution information which are acquired in a person detecting step ST1, in accordance with a person rectangle height narrowing down rule, performing narrowing-down of person image information according to the inside-path narrowing down rule, and acquiring person image information after the narrowing-down and the attribution information about a person corresponding to the person image information.

An area through which people pass often may be set as the path 6, mask image information for masking areas other than the set area may be stored as the inside-path narrowing down rule, and, in the person narrowing down step ST2, the narrowing-down of person image information may be performed on the set area which is not masked, according to the person rectangle height narrowing down rule, without extracting any person image information in the masked areas, which is acquired in the person detecting step ST1, according to the inside-path narrowing down rule.

The image analysis device 1 according to Embodiment 2 of the present disclosure is constructed as above, and, in the case in which there is a path 6 in the monitor space 5, because pieces of person image information is narrowed down on the basis of the inside-path narrowing down rule by means of the person narrowing down unit 12, misrecognition of persons can be reduced more efficiently compared with the image analysis device 1 according to Embodiment 1. As a result, there is provided an advantage of being able to improve the accuracy of the narrowing-down of the pieces of person image information without having to extract samples of target persons to be detected for each different scene, and to cause the image analysis device 1 to learn the samples.

Embodiment 3

Embodiment 3 of the present disclosure will be explained using FIGS. 9 to 11. An image analysis device 1 according to Embodiment 3 includes a narrowing down rule generating unit 17 in addition to the image analysis device 1 shown in Embodiment 1. The other components are the same.

Figure 9:
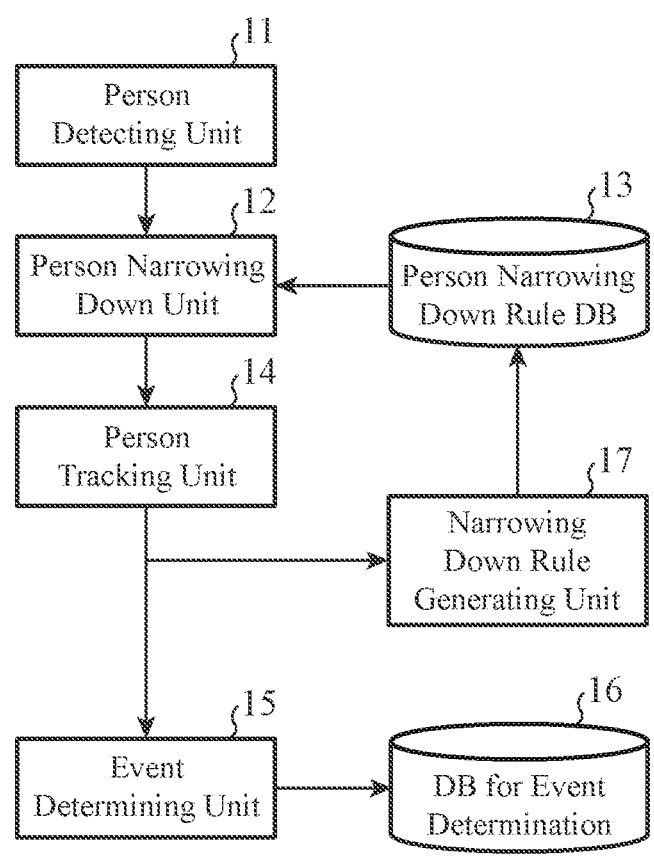
FIG. 9 is a functional configuration diagram showing an image analysis device 1 according to Embodiment 3 of the present disclosure.
Figure 10:
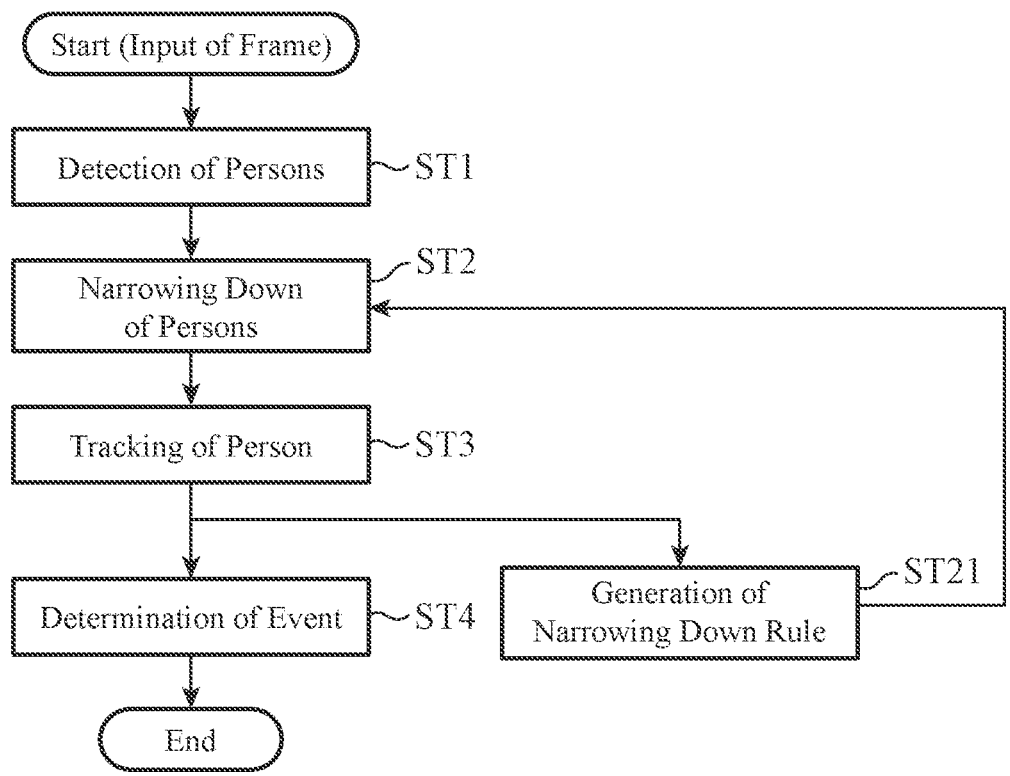
FIG. 10 is a flowchart showing a flow of event reorganization processing in the image analysis device 1 according to Embodiment 3 of the present disclosure.

In FIGS. 9 to 11, the same reference signs as those shown in FIGS. 1 to 6 denote the same components or like components.

Hereafter, an explanation will be made focusing on the narrowing down rule generating unit 17.

The narrowing down rule generating unit 17 generates a self-generated narrowing down rule from a result of tracking of a person from a person tracking unit 14 and attribution information about the person, on the basis of a set-up narrowing down criterion. A person narrowing down rule includes this self-generated narrowing down rule.

The set-up narrowing down criterion includes a first condition and a second condition. On the first condition, when a person rectangle which has appeared as the person tracking result is determined to be a person rectangle intermittently appearing at a random position and the person rectangle is excluded as erroneous detection and erroneous tracking. On the first condition, when a person rectangle which has appeared as the person tracking result is staying at the same position, the person rectangle is excluded because no useful information provided for the generation of a narrowing down rule, irrespective of whether this person rectangle is erroneously detected and whether the person actually exists.

In addition, a time zone within which the number of persons appearing per time in the monitor space, i.e., the number of so-called characters is equal to or smaller than a threshold, e.g., two is extracted. It is expected that the number of candidates to be corresponded to rectangles is small within a not-crowded time zone, and a tracking result which is extracted by following such a procedure includes a result of person detection with a high degree of accuracy.

More specifically, within a time zone within which the number of characters is equal to or less than the threshold, i.e., when the number of persons seen in an image captured by a surveillance camera 2 is small, the number of persons in the image who are candidates to be corresponded to pieces of person rectangle information used by a person narrowing down unit 12 is small and the accuracy of correspondence is high, and, as a result, the accuracy of the person tracking result from the person tracking unit 14 is high.

The unit time during which the number of characters per time is determined may be the time of one frame of the image captured by the surveillance camera 2 or a time within which multiple frames appear.

From person tracking results which have been collected in this way, the geometrical relation between the camera and a floor is calculated in the same way as that explained in Embodiment 1, or a function of determining the height of a person rectangle for each height on the screen is calculated using a method of extracting the relation between the height of a person on the screen on which the person is seen, and the height of the rectangle from an image captured by the camera, and a self-generated narrowing down rule is generated.

More specifically, on the basis of person rectangles excluding both person rectangles intermittently appearing at random positions and person rectangles staying at the same position, out of person rectangles which have appeared as person tracking results from the person tracking unit 14 within a time zone within which the number of characters per time is equal to or less than the threshold, a self-generated narrowing down rule is generated and outputted the rule to a person narrowing down rule database 13. The person narrowing down rule database 13 stores the self-generated narrowing down rule as the person narrowing down rule.

This generation of a self-generated narrowing down rule may be performed for each frame or may be performed at night after data is accumulated during daytime, so as to reduce the frequency of the generating process.

In the person narrowing down rule database 13, using the self-generated narrowing down rule outputted from the narrowing down rule generating unit 17, the self-generated narrowing down rule in the person narrowing down rule is updated. By using this updated self-generated narrowing down rule, the person narrowing down unit 12 narrows down pieces of person image information and pieces of person attribution information from a person detecting unit 11 to person image information.

The hardware configuration of the image analysis device 1 according to this Embodiment 3 is the same as that of the block diagram shown in FIG. 5, and a program shown in FIG. 10, i.e., a program that performs the flowchart showing a processing flow of event recognition in the image analysis device 1 is stored by a ROM 102.

The flowchart shown in FIG. 10 includes a person detecting step ST1, a person narrowing down step ST2, a person tracking step ST3, an event determining step ST4, and a narrowing down rule generating step ST21.

The relation between steps ST1 to ST4 and ST21, and the person detecting unit 11, the person narrowing down unit 12, the person tracking unit 14, an event determining unit 15, and the narrowing down rule generating unit 17 in the image analysis device 1 shown in FIG. 9 is as follows.

More specifically, the person detecting step ST1 corresponds to the step performed by the person detecting unit 11, the person narrowing down step ST2 corresponds to the step performed by the person narrowing down unit 12, the person tracking step ST3 corresponds to the step performed by the person tracking unit 14, and the event determining step ST4 corresponds to the step performed by the event determining unit 15.

The narrowing down rule generating step ST21 corresponds to the narrowing down rule generating unit 17, and a self-generated narrowing down rule is generated from the person tracking result acquired in the person tracking step ST3 on the basis of the above-mentioned criterion and the generated self-generated narrowing down rule is reflected in the narrowing down rule for use in the person narrowing down step ST2.

Further, the program stored in the ROM 102 causes a computer that constitutes the hardware of the image analysis device 1 to perform a person detecting procedure shown as the person detecting step ST1, a person narrowing down procedure shown as the person narrowing down step ST2, a person tracking procedure shown as the person tracking step ST3, an event determining procedure shown as the event determining step ST4, and a narrowing down rule generating procedure shown as the narrowing down rule generating step ST21. This program is read by a CPU 101 from the ROM 102 via a bus 107, and the processing is performed.

Next, the operation of the image analysis device 1 constructed in this way will be explained.

The person narrowing down rule stored in a secondary storage device 104 may be the one which does not include the self-generated narrowing down rule in an initial state, like that shown in Embodiment 1, or may be in a state in which the self-generated narrowing down rule is provided for the person narrowing down rule.

Although an explanation will be made hereafter assuming the state in which the self-generated narrowing down rule is not provided, the self-generated narrowing down rule is updated in the same way even from a state in which the self-generated narrowing down rule is stored in the image analysis device 1 shown in Embodiment 1.

When receiving an instruction to start an image analysis from an input device 105, the CPU 101 reads the program of the person detecting procedure from the ROM 102 and performs the person detecting step ST1, and, after that, reads the program of the person narrowing down procedure from the ROM 102 and performs the person narrowing down step ST2. At this time, because no self-generated narrowing down rule is stored in the secondary storage device 104 as a person narrowing down rule, the pieces of person image information detected in the person detecting step ST1 and the pieces of person attribution information corresponding to the pieces of person image information are not narrowed down on the basis of a self-generated narrowing down rule.

Then, the CPU 101 reads the program of the person tracking procedure from the ROM 102 and performs the person tracking step ST3.

After that, the CPU 101 reads the program of the narrowing down rule generating procedure from the ROM 102 and performs the narrowing down rule generating step ST21.

As a result, a self-generated narrowing down rule is generated on the basis of the above-mentioned criterion, and the generated self-generated narrowing down rule is stored as the person narrowing down rule in the secondary storage device 104.

In the next frame of the image captured by the surveillance camera 2, the pieces of person image information are narrowed down on the basis of the person narrowing down rule stored in the secondary storage device 104, and person image information after the narrowing-down and the person attribution information corresponding to the person image information are acquired.

By repeating this processing, the accuracy of the self-generated narrowing down rule of the person narrowing down rule stored in the secondary storage device 104 is improved, and the accuracy of the narrowing-down of the pieces of person image information is also increased.

In the state in which the accuracy of the narrowing-down of the pieces of person image information is increased, person tracking and the determination of an event are performed.

Because the image analysis device 1 according to Embodiment 3 of the present disclosure is constructed as above, and a self-generated narrowing down rule is generated as the person narrowing down rule by the narrowing down rule generating unit 17 and the self-generated narrowing down rule is used for the narrowing-down of the pieces of person image information, the accuracy of the narrowing-down of the pieces of person image information can be further improved and misrecognition of persons can be reduced efficiently, in addition to providing the same advantage as that provided by the image analysis device 1 according to Embodiment 1. As a result, there is provided an advantage of being able to improve the accuracy of the narrowing-down of the pieces of person image information without having to extract samples of target persons who are desired to be detected for each different scene, and to cause the image analysis device 1 to learn the samples.

Embodiment 4

Next, Embodiment 4 of the present disclosure will be explained.

An image analysis device 1 according to Embodiment 4 has the same basic configuration as the image analysis device 1 shown in Embodiment 3, and more specifically has the same basic configuration as that of the functional configuration diagram shown in FIG. 9 and that of the block diagram shown in FIG. 5. A different point is that as a person narrowing down rule stored in a person narrowing down rule database 13, i.e., a secondary storage device 104 in terms of hardware, an inside-path narrowing down rule for, in the case in which there is a path in monitor space, detecting a person when the person appears in the path is further added to the image analysis device 1 shown in Embodiment 3.

More specifically, in the inside-path narrowing down rule, while path information about a path 6 which is acquired from path maps shown in FIGS. 7 and 8 is stored. Pieces of feet information about person rectangles corresponding to pieces of person image information from a person detecting unit 11 and the path information are compared.

As a comparison result, a result in which it is determined that the feet information about a person rectangle is positioned inside the path information is narrowed down as person image information. This inside-path narrowing down rule is added as one of the person narrowing down rules. This inside-path narrowing down rule of the person narrowing down rule is stored in the person narrowing down rule database 13, i.e., the secondary storage device 104 in terms of hardware.

Further, a person narrowing down step ST2 shown in FIG. 10 is one of performing narrowing-down of person image information on the pieces of person image information and the pieces of person attribution information which are acquired in a person detecting step ST1, in accordance with a person rectangle height narrowing down rule, performing narrowing-down of person image information in accordance with the inside-path narrowing down rule, further performing narrowing-down of person image information in accordance with a self-generated narrowing down rule generated in a narrowing down rule generating step ST21 and sequentially updated, and acquiring person image information after the narrowing-down and the person attribution information corresponding to the person image information.

Although in above-mentioned Embodiment 4 the example in which the inside-path narrowing down rule is generated by storing the path information about the path 6 which is acquired from the path maps shown in FIGS. 7 and 8 is shown, the inside-path narrowing down rule may be generated by a narrowing down rule generating unit 17.

More specifically, a mask image for masking areas other than a path area is generated, and this mask image is determined as the inside-path narrowing down rule.

First, the mask image is initialized by the narrowing down rule generating unit 17 into mask image information in which no area is specified, e.g., mask image information indicating a solid filled box state.

After that, the narrowing down rule generating unit 17 determines the middle point of a base, as a feet position, for each person rectangle in a person tracking result from a person tracking unit 14, and draws a white circle with the center being at the feet position for the mask image stored in the person narrowing down rule database 13. At this time, the radius of the circle may be a fixed value or may be determined in such a way as to be proportional to the size of the rectangle. Further, instead of a circle, another graphic, e.g., a rectangle may be drawn. When the drawing of a white graphic is finished as to all the person rectangles in the person tracking result, a white area on the mask image is defined as the path area.

The mask image information which is determined in this way and in which the white area is defined as the path area is stored, as the inside-path narrowing down rule, in the person narrowing down rule database 13.

In the drawing of a circle, the number of times that the drawing is performed is summed up, instead of performing the drawing in white. Concretely, a method of incrementing a counter by one for each pixel of a target (frame) to be drawn may be used. The count for each pixel which is determined in this way has a value proportional to the frequency of a person's appearance, and, for example, by calculating the product of the count and the reliability of the person detection result, and using, as a detection result, only a product which exceeds a certain threshold, detection in consideration of the possibility of a person's appearance, the possibility depending on the area, can be performed.

Because the image analysis device 1 according to Embodiment 4 of the present disclosure is constructed as above, and, in the case in which there is a path 6 in the monitor space 5, the pieces of person image information are further narrowed down by a person narrowing down unit 12 on the basis of the inside-path narrowing down rule, misrecognition of persons can be reduced more efficiently compared with the image analysis device 1 according to Embodiment 3. As a result, there is provided an advantage of being able to improve the accuracy of the narrowing-down of the pieces of person image information without having to extract samples of target persons who are desired to be detected for each different scene, and to cause the image analysis device 1 to learn the samples.

It is to be understood that an arbitrary combination of two or more of the above-mentioned embodiments can be made, various changes can be made in an arbitrary component according to any one of the above-mentioned embodiments, or an arbitrary component according to any one of the above-mentioned embodiments can be omitted within the scope of the present disclosure.

INDUSTRIAL APPLICABILITY

The image analysis device according to the present disclosure is applied as an image analysis device used for analyzing an image of a surveillance camera mounted in a commercial facility, an airport, a station, a building, an event site, or the like, tracking persons, and detecting an event, thereby serving for crime prevention and marketing. The image analysis device according to the present disclosure is applied as an image analysis device used for analyzing an image of a surveillance camera mounted in a vehicle or the like, tracking persons, and detecting a passenger's doubtful behavior.

REFERENCE SIGNS LIST 1 image analysis device, 11 person detecting unit, 12 person narrowing down unit, 13 person narrowing down rule database, 14 person tracking unit, 15 event determining unit, 17 narrowing down rule generating unit, 101 CPU, 102 ROM, 103 RAM, 104 secondary storage device, ST1 person detecting step, ST2 person narrowing down step, ST3 person tracking step, ST4 event determining step, and ST21 narrowing down rule generating step.

The invention claimed is:

1. An image analysis device comprising:
a person detecting unit for detecting person images from image information from a surveillance camera, and acquiring both pieces of person image information as a result of the detection of person images, and pieces of attribution information about persons corresponding to the pieces of person image information;
a person narrowing down unit for performing person-image-information-narrowing-down with respect to the pieces of person image information and the pieces of person attribution information which are acquired by the person detecting unit, on a basis of a person narrowing down rule, to acquire person image information after the narrowing-down and attribution information about a person corresponding to the person image information;
a person tracking unit for acquiring both a tracking result in the person image information after the narrowing-down by the person narrowing unit and the attribution information about the person corresponding to the person image information, and attribution information about a person who is a target for the tracking result;
an event determining unit for detecting an event on a basis of both the tracking result of a person and the attribution information about the person which are acquired by the person tracking unit; and
a narrowing down rule generating unit for generating a self-generated narrowing down rule from the person tracking result and the person attribution information which are acquired by the person tracking unit, on a basis of a set-up narrowing down criterion,
wherein the person narrowing down rule includes the self-generated narrowing down rule, and
the self-generated narrowing down rule is based on person rectangles excluding both person rectangles intermittently appearing at random positions and person rectangles staying at identical positions, out of person rectangles which have appeared, as the person tracking result acquired by the person tracking unit, within a time zone within which a number of person rectangles per time which have appeared as the person tracking result acquired by the person tracking unit is equal to or less than a threshold.

2. The image analysis device according to claim 1, wherein the person narrowing down rule includes a person rectangle height narrowing down rule for excluding, as misrecognition, a person rectangle which falls outside a detection range of person rectangle heights in which an upper limit and a lower limit are set up depending on a person height.

3. The image analysis device according to claim 1, wherein the person narrowing down rule includes an inside-path narrowing down rule for narrowing down to person image information in which feet information about a person rectangle is determined to be positioned inside path information about space monitored by the surveillance camera.

4. The image analysis device according to claim 3, wherein the inside-path narrowing down rule is mask image information which is generated by the narrowing down rule generating unit and which is defined as a path area on a basis of feet position information about a person rectangle in the person tracking result from the person tracking unit.

5. An image analysis method comprising:
detecting person images from image information from a surveillance camera, and acquiring both pieces of person image information as a result of the detection of person images, and pieces of attribution information about persons corresponding to the pieces of person image information;
performing person-image-information-narrowing-down with respect to the pieces of person image information and the pieces of person attribution information which have been acquired, on a basis of a person narrowing down rule, to acquire person image information after the narrowing-down and attribution information about a person corresponding to the person image information;
acquiring both a tracking result in the person image information after the narrowing-down and the attribution information about the person corresponding to the person image information, and attribution information about a person who is a target for the tracking result;
detecting an event on a basis of both the tracking result of a person and the attribution information about the person which have been acquired; and
generating a self-generated narrowing down rule from the person tracking result and the person attribution information which have been acquired, on a basis of a set-up narrowing down criterion, and
wherein the person narrowing down rule includes the self-generated narrowing down rule, and
wherein the self-generated narrowing down rule generated on the basis of the set-up narrowing down criterion is based on person rectangles excluding both person rectangles intermittently appearing at random positions and person rectangles staying at identical positions, out of person rectangles which have appeared, as the person tracking result having been, within a time zone within which a number of person rectangles per time which have appeared as the person tracking result having been acquired is equal to or less than a threshold.

6. The image analysis method according to claim 5, wherein the person narrowing down rule includes a person rectangle height narrowing down rule for excluding, as misrecognition, a person rectangle which falls outside a detection range of person rectangle heights in which an upper limit and a lower limit are set up depending on a person height.

7. The image analysis device according to claim 5, wherein the person narrowing down rule includes an inside-path narrowing down rule for narrowing down to person image information in which feet information about a person rectangle is determined to be positioned inside path information about space monitored by the surveillance camera.

8. A non-transitory computer readable recording medium having stored thereon a program to be executed on a computer, the program causing the computer to perform:
detecting person images from image information from a surveillance camera, and acquiring both pieces of person image information as a result of the detection of person images, and pieces of attribution information about persons corresponding to the pieces of person image information; and
performing person-image-information-narrowing-down with respect to the pieces of person image information and the pieces of person attribution information which have been acquired, on a basis of a person narrowing down rule, to acquire person image information after the narrowing-down and attribution information about a person corresponding to the person image information;
acquiring both a tracking result in the person image information after the narrowing-down and the attribution information about the person corresponding to the person image information, and attribution information about a person who is a target for the tracking result;
detecting an event on a basis of both the tracking result of a person and the attribution information about the person which have been acquired; and
generating a self-generated narrowing down rule from the person tracking result and the person attribution information which have been acquired, on a basis of a set-up narrowing down criterion,
wherein the person narrowing down rule includes the self-generated narrowing down rule, and
the self-generated narrowing down rule is based on person rectangles excluding both person rectangles intermittently appearing at random positions and person rectangles staying at identical positions, out of person rectangles which have appeared, as the person tracking result having been acquired, within a time zone within which a number of person rectangles per time which have appeared as the person tracking result having been acquired is equal to or less than a threshold.

9. The non-transitory computer readable recording medium according to claim 8, wherein the person narrowing down rule includes a person rectangle height narrowing down rule for excluding, as misrecognition, a person rectangle which falls outside a detection range of person rectangle heights in which an upper limit and a lower limit are set up dependently on a person height.

10. The non-transitory computer readable recording medium according to claim 8, wherein the person narrowing down rule includes an inside-path narrowing down rule for narrowing down to person image information in which feet information about a person rectangle is determined to be positioned inside path information about space monitored by the surveillance camera.

\* \* \* \* \*